June 20, 1933.  M. FEIG  1,914,598
DRIP CATCHER FOR RETAILING AND DISPENSING VESSELS
Filed Oct. 27, 1932
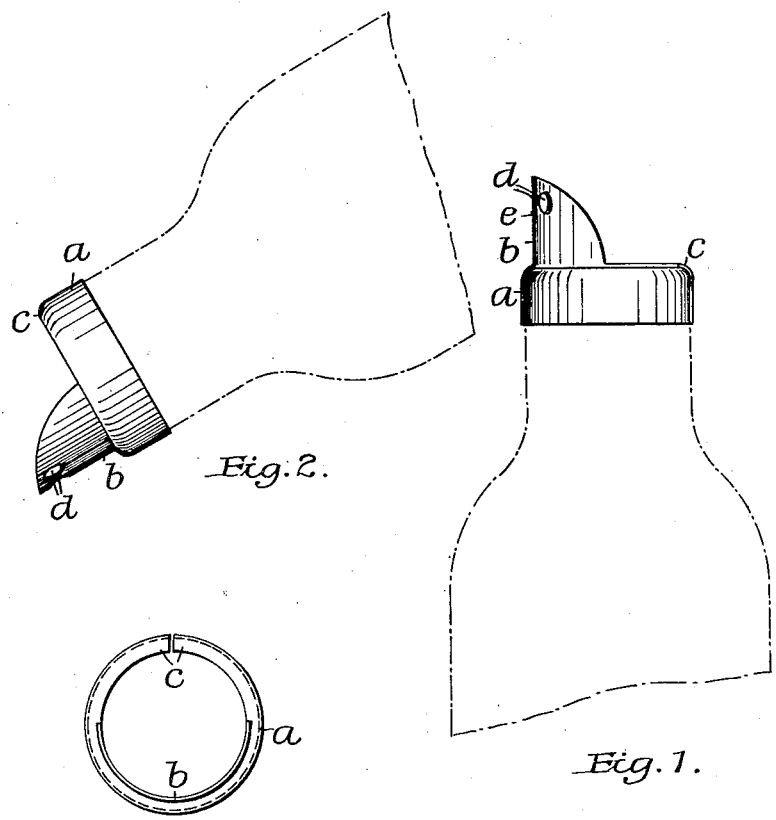
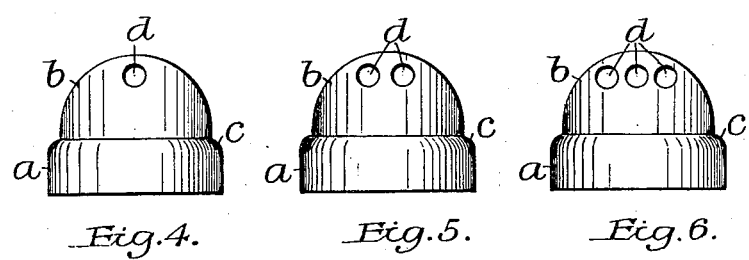
Inventor
Max Feig Patented June 20, 1933

1,914,598

UNITED STATES PATENT OFFICE

MAX FEIG, OF HAMBURG, GERMANY

DRIP CATCHER FOR RETAILING AND DISPENSING VESSELS

Application filed October 27, 1932, Serial No 639,860, and in Germany December 30, 1930.

In order to catch the drip from the pouring lips of retailing and dispensing vessels, it has been proposed to provide the lip near its pouring edge with an aperture intended to catch the drip and lead it back into the vessel. The action of this drip catcher is due to the surface tension of the liquid, and this tension tends to retain the drop in the aperture.

According to the present invention one or more apertures are provided which are of circular shape and which are conically widened in inward direction. With this arrangement the meniscus formed by the surface tension in the circular aperture will, owing to the reduction in volume under atmospheric influences, cause the drop to detach itself from the upper edge of the aperture and thus lose its support and flow back into the vessel along the lower slope of the aperture.

Fig. 1 of the accompanying drawing represents a view of a vessel provided with a detachable drip catcher according to the invention, Fig. 2 shows the vessel tilted for pouring, Fig. 3 is a plan view of the drip catcher, and Figs. 4, 5 and 6 are views of different modifications of the drip catcher.

In the illustrated construction the drip catcher comprises a pouring lip $b$ formed integrally with a split ring $a$ which is adapted to grip the rim at the mouth of the vessel and which is formed with an inturned upper supporting edge $c$ from which the lip rises. Naturally the lip may be made integrally with the vessel, this being preferable for instance in the case of teapots and the like. The lip $b$ and ring $a$ are either made of precious metal or suitably protected from oxidation.

The lip is formed, near its pouring edge, with one or more circular apertures $d$ in order to catch the drip on the vessel being righted. Fig. 4 shows a lip with only one aperture, Fig. 5 shows a lip provided with two, and Fig. 6 a lip provided with three apertures for catching the drip. The apertures are widened conically in inward direction so as to form an inwardly and downwardly sloping lower edge $e$ which will facilitate the return of the drip to the vessel. Since the inner surface of the lip gets moistened during the pouring and since the drip flows more readily over a moist surface than a dry one, the drops retained in the apertures will, on the vessel being righted, find the way prepared for an easy return to the vessel.

The ring $a$ may be adapted for connection to vessels of different kinds so long as the lip $b$ can be placed in position for convenient pouring.

The illustrated arrangement may be subjected to various modifications without departing from the spirit of the invention.

I claim:

1. A drip catcher for retailing and dispensing vessels comprising a pouring lip having near its pouring edge a circular aperture which is conically widened in inward direction.

2. A drip catcher for retailing and dispensing vessels comprising a pouring lip having near its pouring edge circular apertures which are conically widened in inward direction.

MAX FEIG.